US007325327B2

(12) United States Patent
Fischer

(10) Patent No.: US 7,325,327 B2
(45) Date of Patent: Feb. 5, 2008

(54) METHOD AND APPARATUS FOR MEASURING ANGULAR OR LINEAR DISPLACEMENT

(76) Inventor: David C. Fischer, 11 Upland Dr., Chappaqua, NY (US) 10514

( * ) Notice: Subject to any disclaimer, the term of this patent is extended or adjusted under 35 U.S.C. 154(b) by 0 days.

(21) Appl. No.: 10/660,543

(22) Filed: Sep. 12, 2003

(65) Prior Publication Data

US 2004/0080306 A1    Apr. 29, 2004

(51) Int. Cl.
 *A45B 3/08* (2006.01)
(52) U.S. Cl. .......................... 33/706; 33/784; 33/708; 33/366.24
(58) Field of Classification Search .......... 33/706–708, 33/561, 366.11, 366.21, 366.24–366.27, 1 PT, 33/783, 784, 806, 810; 702/80, 97, 150, 702/158, 160, 187
See application file for complete search history.

(56) References Cited

U.S. PATENT DOCUMENTS

| 2,418,576 | A | * | 4/1947 | Conrad | 340/685 |
|---|---|---|---|---|---|
| 2,637,527 | A | * | 5/1953 | Andrews, Jr. | 175/94 |
| 2,842,852 | A | * | 7/1958 | Tanguy | 33/708 |
| 3,004,613 | A | * | 10/1961 | Murphey | 175/45 |
| 3,077,233 | A | * | 2/1963 | Armstrong | 175/45 |
| 3,791,042 | A | * | 2/1974 | Bell | 340/853.8 |
| 4,468,860 | A | * | 9/1984 | Rodengen | 33/784 |
| 4,493,155 | A | * | 1/1985 | Comeau et al. | 33/366.26 |
| 4,601,053 | A | * | 7/1986 | Grumet | 382/106 |
| 4,845,646 | A | * | 7/1989 | Marquis et al. | 702/162 |
| 4,855,942 | A | * | 8/1989 | Bianco | 702/160 |
| 4,912,662 | A | * | 3/1990 | Butler et al. | 702/154 |
| 4,918,608 | A | * | 4/1990 | Middleton et al. | 701/50 |
| 4,964,306 | A | * | 10/1990 | Jacobsen et al. | 73/763 |
| 5,067,249 | A | * | 11/1991 | Terrigno | 33/773 |
| 5,154,003 | A | * | 10/1992 | Moore | 33/558.01 |
| 5,163,228 | A | * | 11/1992 | Edwards et al. | 33/1 N |
| 5,311,666 | A | * | 5/1994 | Jacobsen et al. | 33/1 PT |
| 5,673,491 | A | * | 10/1997 | Brenna et al. | 33/366.24 |
| 5,821,414 | A | * | 10/1998 | Noy et al. | 73/152.54 |
| 6,165,083 | A | * | 12/2000 | Stenger et al. | 473/404 |
| 6,170,162 | B1 | * | 1/2001 | Jacobsen et al. | 33/1 PT |
| 6,243,660 | B1 | * | 6/2001 | Hsu et al. | 702/160 |
| 6,279,248 | B1 | * | 8/2001 | Walters | 33/784 |
| 6,658,755 | B2 | * | 12/2003 | Arlinsky | 33/760 |
| 7,096,591 | B2 | * | 8/2006 | Glantz et al. | 33/290 |
| 2003/0128028 | A1 | * | 7/2003 | Jordil | 324/207.21 |
| 2003/0177649 | A1 | * | 9/2003 | Ito et al. | 33/1 PT |

\* cited by examiner

*Primary Examiner*—G. Bradley Bennett
*Assistant Examiner*—Tania C Courson
(74) *Attorney, Agent, or Firm*—Marvin Gordon

(57) ABSTRACT

An apparatus and method are disclosed for measuring the angular or linear displacement of an object. That displacement is transmitted to a movable conductive member, which, in response thereto, is moved to a position at which it electrically contacts one of a plurality of fixed contacts, thereby to complete an electrical circuit that includes a memory location in a read-only memory that contains digital data representing the amount of displacement that correlates to the fixed contact associated with that memory location. That digital data is transferred to an output device for display or additional data processing.

10 Claims, 2 Drawing Sheets

METHOD AND APPARATUS FOR
MEASURING ANGULAR OR LINEAR
DISPLACEMENT

FIELD OF THE INVENTION

The present invention relates generally to the determination of the displacement of an object, and more particularly to an apparatus and method for determining the angular or linear displacement of an object.

BACKGROUND OF THE INVENTION

Numerous devices have been devised over the years for measuring the angular or linear displacement of an object. One such device, known as an inclinometer, measures the inclination of an object relative to one or more horizontal axes. For example, an inclinometer that is able to measure the angular orientation or inclination of a ship or a boat may consist of a curved tube filled with a liquid containing a bubble. The tube is aligned abeam and attached to a vertical structure on the center line of the vessel. As the vessel tilts or inclines off the vertical, the bubble aligns with a number on a scale running the length of the tube, thereby indicating the degree of the vessel's tilt. Data generated by such devices, however, cannot be readily converted into electronic form.

Another known device for measuring displacement is based on the extent of motion of a sensor across a variable resistor. The amount of current flowing through the resistor following displacement is compared to a base value, thereby to determine the amount of angular or linear displacement. This type of measurement device, however, requires the use of an analog-to-digital converter to display this measurement in digital form or for further digital data processing.

Yet a further known displacement-measuring device employs a light source, typically a laser, to read codes imprinted on an object that rotates or otherwise moves in response to the force that is causing the displacement. The codes are positioned such that the amount of the displacement causes the code that indicates that amount to become aligned with the beam of light that reads the code, thereby to produce a digital signal that represents the measured displacement.

Devices are also known for measuring the inclination of an object that measure the magnitude of inclination and produce an electrical analog or digital signal that is representative of the inclination angle. For example, in U.S. Pat. No. 6,449,857 there is shown an electronic inclinometer in which measuring electrodes are located on the exterior of a dielectric cell that is isolated from a sensor fluid. The signals derived by the sensors are converted to frequency signals that are processed by a microprocessor. Other prior art electronic inclinometers are disclosed in U.S. Pat. Nos. 6,578,797; 6,249,984; 5,774,996; 5,761,818; 5,428,902; and 4,811,491.

Whereas the known prior art displacement-measuring devices, such as those described above, provide generally accurate measurements of angular or linear displacement, they each fall short in some manner of providing digital displacement measurement data in a relatively direct, simple and low-cost manner and with high reliability and low power consumption.

SUMMARY OF THE INVENTION

Accordingly, it is an object of the present invention to provide an apparatus and method for measuring angular and linear displacement with accuracy and reliability and at a relatively low cost and ease of operation.

It is a further object of the invention to provide an apparatus and method of the type described which provides a digital indication of the measured displacement without the need for complex and costly analog-to-digital converters.

In the apparatus of the invention, the force associated with the displacement of the object to be determined causes the movement of a movable conductive member along a path on which are located a plurality of spaced contacts each of which is respectively in circuit connection with one of a plurality of addresses in a memory. When the movable member thus engages one of these contacts it completes an electrical circuit that includes that contact and an address in the memory that is uniquely associated with that contact and which contains measurement data that corresponds to the relative position of the contact with which it is associated and connectable by means of the movable member.

In one embodiment of the invention herein described, the measurement data are stored in a read-only memory (ROM) and the data stored in the memory locations connected in circuit relation with the movable member are provided to an external digital display. In the case of linear displacement, as an example, if the amount of displacement of the object is, say, two centimeters, the movable conductive member completes a circuit between the movable contact member and one of the fixed contacts arranged along its path of possible movement, thereby to cause the location in ROM associated with that one contact and containing the digital representation of that amount of displacement to be applied either directly to a display, if the purpose of the device is merely to measure that displacement, or, in the alternative, to a CPU that performs an operation on the data, and then applies the processed data to a display.

If, or example, the apparatus of the invention is intended for use as an electronic ruler, the user would align the conductive movable member alongside the object being measured, with the base of the conductive member aligned with one end of the object. The user would then slide the movable conductive member until it is aligned with the other end of the object. The thus-measured length of the object would be digitally electronically displayed. If, on the other hand, the apparatus were used to measure the deceleration of a vehicle, the data derived from the linear displacement of the movable member could be operated upon with other relevant data, such as time, to determine the amount of deceleration of the vehicle at that particular time. That data, if desired, could, in turn, be operated on to determine the speed of the vehicle just prior to the deceleration.

When the apparatus of the invention is used to measure angular displacement, the path along which the conductive member is caused to move is preferably arcuate, and the data stored in the memory locations would preferably equal the angle formed by the respective radii of the movable conductive member at its base location and its post-displacement location, or, as an alternative, the sine or other function of that angle. An apparatus of this type that measures angular displacement could be used manually, for example, to measure the angle of material, e.g.; sheet metal, plywood or cloth, that is to be cut, or in an automatic fashion to measure the heel or tilt of a boat or the lean of an automobile body.

The particular configuration of the elements of the displacement-measuring apparatus of the invention can vary depending on its particular intended application. For example, if the apparatus is intended for use in measuring angular displacement, the conductive movable member may be a rotating needle that is connected at one of its ends to a voltage source, and at its other, free end is movable along an arcuate path to make electrical connection with one of a series of spaced contacts arranged along the path that are respectively connected to appropriate memory locations in ROM, thereby to cause the data from the thus-connected ROM memory location to be applied to the output device. Alternatively, the movable contact may be movable in response to displacement being measured along a plurality of pairs of contacts arranged on opposing sides of a groove. All of the contacts on one side of the groove are connected respectively to an appropriate memory location in ROM. The movement of the conductive member along the groove causes the conductive member to engage both contacts in a pair, thereby to complete a circuit that causes the data stored in the associated memory location in ROM connected to those contacts to be applied to an output device.

BRIEF DESCRIPTION OF THE DRAWINGS

To the accomplishment of the above and such further objects that may hereinafter appear, the present invention relates to an apparatus and method for measuring angular or linear displacement, substantially as defined in the appended claims and as described in the following detailed description of presently preferred embodiments thereof considered with the accompanying drawings, in which:

DETAILED DESCRIPTION OF THE PREFERRED EMBODIMENTS

Figure 1:
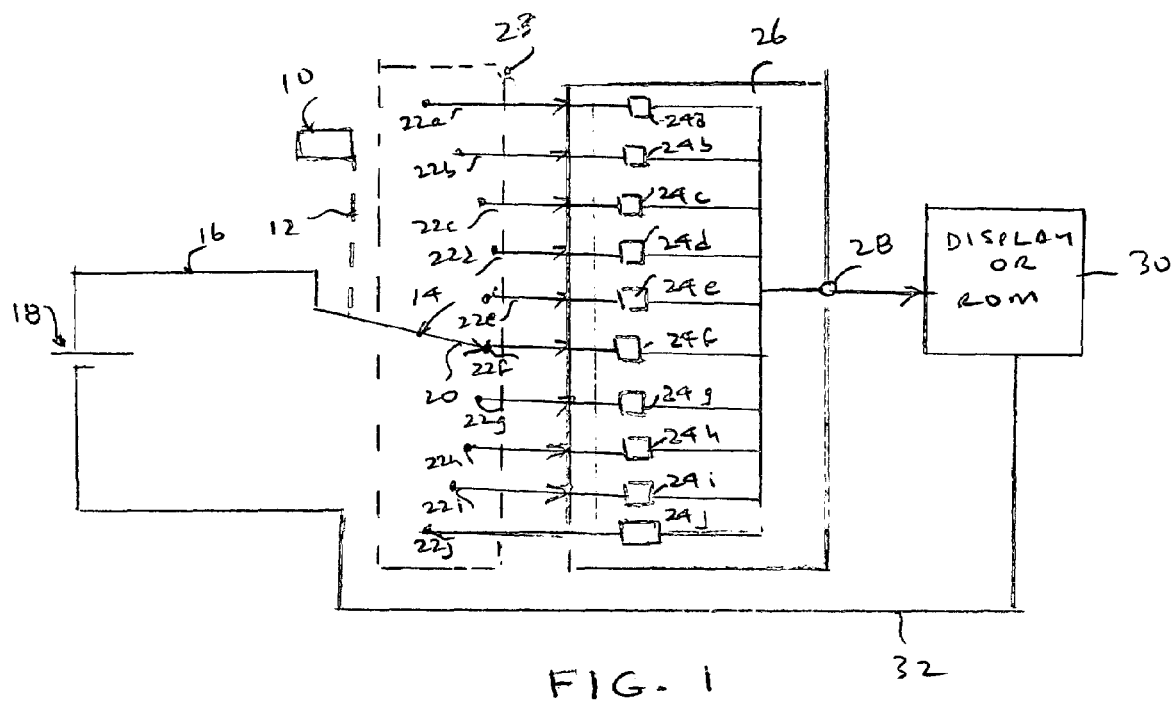
FIG. 1 is a schematic diagram of a displacement-measuring apparatus in accordance with a first embodiment of the invention.

The embodiment of the displacement-measuring apparatus illustrated in FIG. 1 provides a digital representation of the angular displacement, e.g., inclination or tilt of an object 10 with respect to at least one axis. As shown in FIG. 1, object 10 is mechanically coupled by means of a mechanical linkage 12 to a movable, here pivotable, conductive contact 14. One end of movable contact is connected by a lead 16 to one terminal of a voltage source 18. Linkage 12 may, for example, include a pin (not shown) that protrudes perpendicularly from the base of contact 14. That pin is advantageously set in a conductive collar (also not shown) which is connected to voltage source 18. The pin and collar are preferably snugly fit in a manner that permits electric current to pass from the collar to the pin while still allowing relative free rotation of the pin within the collar. If necessary, to achieve such free rotation, a conductive lubricant may be inserted between the pin and the collar.

The other, free end 20 of movable contact 14 is pivotable in accordance with the angular movement or displacement of object 10 via linkage 12 along an arcuate path along which are arranged a plurality of fixed, angularly spaced contacts, here shown for purposes of example as ten in number, 22a-22j. As shown in FIG. 1, contacts 22 may be secured to an insulator support 23.

Contacts 22 are respectively connected to a corresponding plurality of memory locations 24a-24j in a read-only memory (ROM) 26. The data stored in memory locations 24 represent in digital form the relative angular positions of the fixed contacts 22 to which they are respectively connected and thus associated. That data may advantageously equal the angle formed by the respective radii of the movable contact 14 at its base or fixed location and its post-displacement location, or, as an alternative, the sine or other function of that angle.

The outputs of memory locations 24 are connected to an output node 28 of ROM 26; output node 28 is, in turn, connected to an output device 30, which may, as shown in FIG. 1, be a numerical display or a CPU unit. Output device 30 may be, as shown, connected to the opposite side or terminal of voltage source 18 by means of a lead 32.

In the operation of the apparatus of FIG. 1, as the object 10 moves along an angular displacement, e.g., tilts or inclines, its angular motion is transmitted by linkage 12, thereby to cause the free end 20 of movable contact 14 to undergo a corresponding displacement along an arcuate path. Depending on its initial position and the extent of that movement, the free end of contact 14 will move to a position at which it engages one of fixed contacts 22. In FIG. 1, for example, the free end of movable contact 14 is shown as being in electrical engagement with contact 22f.

Upon such an occurrence, an electrical circuit is completed that includes voltage source 18, movable contact 14, and the memory location 24 in ROM 26 that is connected to, or associated with, the one of contacts 22 with which the free end 20 of movable contact 14 is then in electrical contact. The digital angular position data stored in that memory location are transferred to a storage register (not shown) and from the register via node 28 to be either displayed or further digitally processed in output device 30.

As the conductive member travels along its path, the value corresponding to the last contact (or contacts) that was touched by the movable conductive member would be displayed. Each displayed value between zero and the conductive element's last resting point would be displayed seriatim (albeit briefly) as the conductive member travels along its path. Stated differently, the measured value that corresponds to the most recently completed circuit is displayed until it is displaced by a new value that corresponds to a subsequently completed circuit. If the conductive member comes to rest on a non-conductive portion of its path, the last value that is displayed remains on display until the conductive member moves again or the apparatus is reset.

Figure 2:
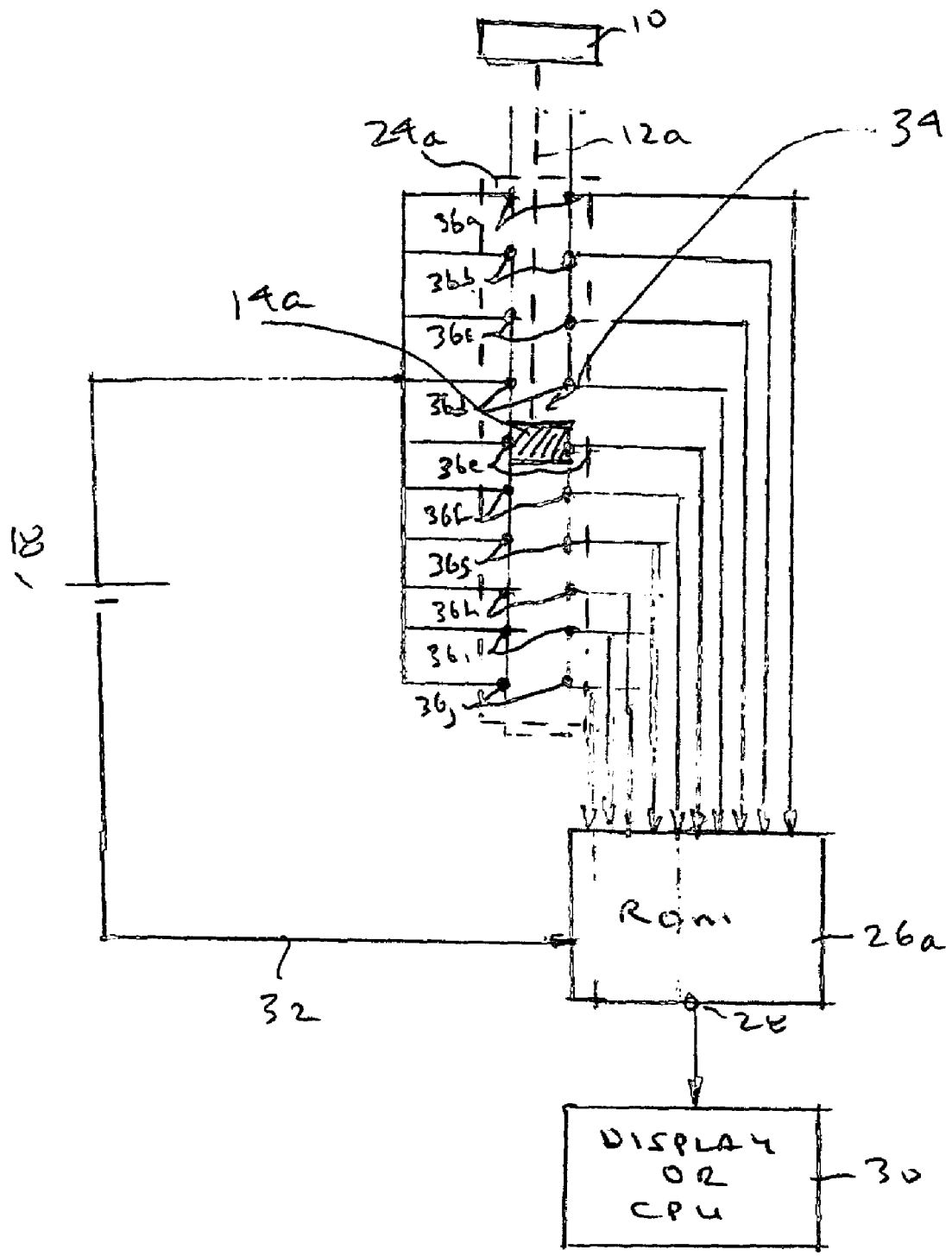
FIG. 2 is a schematic diagram of an apparatus according to a second embodiment of the invention.

The embodiment of the displacement-measuring apparatus of the invention illustrated in FIG. 2, in which elements corresponding to those in the embodiment of FIG. 1 are designated by corresponding reference numerals, is adapted to measure the linear displacement of an object 10. In this embodiment, object 10 is mechanically linked by a linkage 12a to a movable conductive member 14a, which is movable along a linear axial path within a groove 34. On each side of groove 34 are arranged opposed pairs of fixed contacts 36a-36j.

One of each pair of contacts 36 (the right-hand contact as viewed in FIG. 2) is connected to an associated one of a plurality of memory locations (not illustrated in FIG. 2) in a ROM 26a. As in the embodiment of FIG. 1, the memory locations in ROM 26a contain digital displacement data uniquely representative of the relative axial position of the fixed contact pair 36 to which it is connected.

In the operation of the apparatus of FIG. 2, as the object 10 moves its linear motion is transmitted by linkage 12a to cause a corresponding linear or axial motion of movable conductive member 14a within groove 34. Depending on the location in groove 34 to which member 14a is thus moved, the latter spans and thus makes electrical contact with one of the pairs of opposed contacts 36 (contact pair 36e in FIG. 2), thereby to create an electrical circuit with those contacts, voltage source 18 and the memory location in ROM 26a to which that contact pair is then connected. As in the previously described embodiment, the data in that memory location is transferred for either display or further processing in output device 30.

As will be apparent to those skilled in the art, various modifications may be made to the embodiments of the invention hereinabove described without departing from the spirit and scope of the invention as defined in the appended claims.

What is claimed is:

1. An apparatus for measuring the distance traveled along an arcuate path by a movable object, said apparatus comprising:
    a member movable along a fixed arcuate path to a position along-said path corresponding to the relative position of the object;
    a plurality of spaced electrical contacts insulated from one another and positioned along at least one side of said path, said movable member contacting one of said plurality of contacts at the current position of said movable member along said arcuate path;
    data-storing means including a corresponding plurality of memory locations each of which stores preset, different distance-measurement data;
    means coupled to each of said plurality of contacts for respectively electrically connecting each of said plurality of contacts to each of said memory locations, each of said distance-measurement data stored respectively in said plurality of memory locations being uniquely associated with the relative location of said plurality of contacts along said path;
    output means connected to said data-storing means; and
    means connected to said plurality of contacts for applying a control signal to the one of said memory locations that is connected to the one of said plurality of contacts then in contact with said movable member, said control signal being effective to transfer the distance-measurement data stored in the said one of said memory locations to said output means;
    whereby said movable member is effective as it moves along said path to cause only the distance-measurement data stored in the said one of said memory locations to be applied to said output means.

2. The apparatus of claim 1, in which said output device is a display device.

3. The apparatus of claim 1, in which said output device is a CPU.

4. The apparatus of claim 1, in which said movable member is connected at one of its ends to a voltage source and its other end is movable along said arcuate path to make electrical contact with one of said contacts.

5. The apparatus of claim 1, in which said data-storing means is a ROM.

6. The apparatus of claim 1, further comprising a voltage source, said member being effective when in electrical contact with one of said contacts to place one of said memory locations in circuit arrangement with said voltage source and to provide said control signal to said one of said memory locations.

7. The apparatus of claim 6, in which said output means is a display device.

8. The apparatus of claim 6, in which said output means is a CPU.

9. The apparatus of claim 6, in which said data-storing means is a ROM.

10. A method for determining the distance traveled by a movable object along an arcuate path, said method comprising the steps of:
    arranging a plurality of fixed, spaced and insulated contacts along at least one side of a fixed arcuate path;
    moving an electrically conductive member along said path by an amount representative of the relative movement of said object, thereby causing said movable member to make electrical contact with one of said contacts;
    storing respectively a corresponding plurality of different preset distance-measurement data in a corresponding plurality of data-storing locations in a memory, the distance-measurement data stored in said plurality of data-storing locations being respectively uniquely associated with one of said plurality of contacts;
    electrically connecting each of said plurality of contacts respectively to each of said plurality of data-storing locations through a corresponding plurality of conductors;
    causing a control signal to be applied over one of said plurality of conductors to the one of said data-storing locations associated with, and connected to, the one of said plurality of contacts then contacted by said movable member and thereby causing the distance-measurement data stored in said one of said data-storing locations to be applied to an output device.

* * * * *